US007213361B1

(12) United States Patent
Perigo, Sr.

(10) Patent No.: US 7,213,361 B1
(45) Date of Patent: May 8, 2007

(54) FISHING POLE STAND, AND METHODS

(76) Inventor: Todd Steven Perigo, Sr., 3544 Faust Lake Rd., Rhinelander, WI (US) 54501

( * ) Notice: Subject to any disclaimer, the term of this patent is extended or adjusted under 35 U.S.C. 154(b) by 0 days.

(21) Appl. No.: 11/275,511

(22) Filed: Jan. 11, 2006

(51) Int. Cl.
A01K 97/10 (2006.01)

(52) U.S. Cl. ............... 43/21.2; 248/520; 248/529; 248/533; 248/163.1; 248/165

(58) Field of Classification Search ......... 43/21.2, 43/17; 248/519, 520, 528, 529, 532, 533, 248/163.1, 165
See application file for complete search history.

(56) References Cited

U.S. PATENT DOCUMENTS

| | | | | |
|---|---|---|---|---|
| 496,851 | A | * | 5/1893 | Bunker et al. ............ 248/170 |
| 505,149 | A | * | 9/1893 | Weyl ....................... 248/165 |
| 955,349 | A | * | 4/1910 | O'Brien .................... 248/165 |
| 1,144,726 | A | * | 6/1915 | Robinson et al. .......... 248/165 |
| 1,298,380 | A | * | 3/1919 | Owen ....................... 248/529 |
| 1,448,171 | A | * | 3/1923 | Waderlow .................. 248/165 |
| 1,496,465 | A | * | 6/1924 | Jackson .................... 248/165 |
| 1,577,612 | A | * | 3/1926 | Dees ........................ 43/21.2 |
| 1,748,597 | A | * | 2/1930 | Collins ..................... 248/165 |
| 2,090,783 | A | * | 8/1937 | Chinn ....................... 248/165 |
| 2,159,760 | A | * | 5/1939 | Fitzgerald ................. 248/528 |
| 2,430,840 | A | * | 11/1947 | Westfall .................... 248/529 |
| 2,624,972 | A | * | 1/1953 | Burg ........................ 43/17 |
| 2,650,052 | A | * | 8/1953 | Bintz ....................... 43/21.2 |
| 2,663,962 | A | * | 12/1953 | King ........................ 43/17 |
| 2,665,866 | A | * | 1/1954 | Goldinger ................. 43/21.2 |
| 2,732,649 | A | * | 1/1956 | Tuttle ...................... 43/17 |
| 2,773,326 | A | * | 12/1956 | Calvert ..................... 43/16 |
| 2,839,865 | A | * | 6/1958 | Lubanski ................... 43/21.2 |
| 2,920,851 | A | * | 1/1960 | Carlini ..................... 248/171 |
| 3,147,563 | A | * | 9/1964 | Molter ...................... 43/17 |
| 3,239,176 | A | * | 3/1966 | Johnson .................... 248/528 |
| 3,516,190 | A | * | 6/1970 | Cook ........................ 43/21.2 |
| 3,632,073 | A | * | 1/1972 | Nakatani ................... 248/169 |
| 3,824,730 | A | * | 7/1974 | Johnson .................... 43/17 |
| 3,858,833 | A | * | 1/1975 | Fink ........................ 248/533 |
| 3,908,945 | A | * | 9/1975 | Shapiro et al. ............ 248/165 |
| 3,984,935 | A | | 10/1976 | Petersen, Jr. |
| 4,020,579 | A | | 5/1977 | Snider |
| 4,033,062 | A | * | 7/1977 | Denecky .................... 43/21.2 |
| 4,043,070 | A | * | 8/1977 | Lamothe .................... 43/21.2 |
| 4,161,839 | A | * | 7/1979 | Ward ........................ 43/21.2 |
| 4,373,287 | A | * | 2/1983 | Grahl ....................... 43/17 |

(Continued)

FOREIGN PATENT DOCUMENTS

CA       2077694 A1  *  3/1994

(Continued)

*Primary Examiner*—Darren W. Ark
(74) *Attorney, Agent, or Firm*—Merchant & Gould P.C.

(57) ABSTRACT

The present invention is directed to a support stand for a fishing pole holder, and is particularly adapted for ice fishing. In use, the stand holds the fishing pole in a generally upward angled position. The fishing pole is held in a pivotal position, so that upon sensing a hit on the attached line, the fishing pole tips downward. Legs, for supporting the body of the stand, can be placed in a first position or a second position, depending on the conditions of use for the stand. When not in use, the legs of the stand can be stored within the body.

7 Claims, 7 Drawing Sheets

U.S. PATENT DOCUMENTS

| | | | | |
|---|---|---|---|---|
| 4,407,182 A | * | 10/1983 | Biasini | 248/170 |
| 4,550,520 A | * | 11/1985 | Bogue | 43/21.2 |
| 4,567,686 A | * | 2/1986 | Akom | 43/17 |
| 4,642,930 A | * | 2/1987 | Graf | 43/17 |
| 4,653,710 A | * | 3/1987 | Dickison | 248/163.1 |
| 4,656,774 A | | 4/1987 | Terrill | |
| 4,658,534 A | | 4/1987 | McLean | |
| 4,829,697 A | * | 5/1989 | Nakata | 43/17 |
| 4,837,965 A | * | 6/1989 | True | 43/17 |
| 4,845,881 A | * | 7/1989 | Ward | 43/21.2 |
| 4,854,069 A | * | 8/1989 | Smith et al. | 43/21.2 |
| 4,915,332 A | * | 4/1990 | Ouellette | 248/528 |
| 4,984,761 A | * | 1/1991 | Chen | 248/165 |
| 5,050,333 A | * | 9/1991 | Debreczeni | 43/17 |
| 5,163,243 A | * | 11/1992 | Wold et al. | 43/17 |
| 5,345,708 A | | 9/1994 | Loyd | |
| 5,367,815 A | * | 11/1994 | Liou | 43/21.2 |
| 5,491,923 A | | 2/1996 | Zingrone | |
| 5,560,137 A | * | 10/1996 | Herring | 43/21.2 |
| 5,890,312 A | * | 4/1999 | Ball | 43/16 |
| 5,987,801 A | * | 11/1999 | Anderson | 43/17 |
| 5,992,080 A | * | 11/1999 | Allen | 43/19.2 |
| 6,079,142 A | * | 6/2000 | Danser et al. | 43/17 |
| 6,216,998 B1 | * | 4/2001 | Butrymowicz et al. | 43/21.2 |
| 6,293,511 B1 | * | 9/2001 | Shepherd | 248/441.1 |
| 6,438,889 B1 | * | 8/2002 | Handy | 43/21.2 |
| 6,463,691 B1 | * | 10/2002 | Atkins | 43/17 |
| 6,622,421 B1 | * | 9/2003 | Daniels | 43/21.2 |

FOREIGN PATENT DOCUMENTS

JP            11-266766 A    *   10/1999

* cited by examiner

FISHING POLE STAND, AND METHODS

TECHNICAL FIELD

The present disclosure relates to a support stand for a fishing pole, particularly a fishing pole for ice fishing.

BACKGROUND

Fishing pole holders and other supports are well known and are used to support fishing poles in a raised position during use, thereby eliminating the need for the fisherman to handle the pole at all times. This is particularly useful in ice fishing, where it is well known that the fisherman does not sit watching his pole all day.

Various configurations of fishing pole holders for ice fishing are known. Some holders include a spike which is pounded into the ice to provide a stable pole support. Other are an attachment to an item, such as bucket or pail.

Many pole holders includes an indicating device, which is triggered by movement of the fishing line to signal the presence of a potential catch if the fisherman takes over control of the fishing pole. This indication is often the fishing pole tipping up.

There is always a desire for improved ice fishing equipment.

SUMMARY OF THE INVENTION

The present invention provides a new fishing pole support stand, which is particularly suited for ice fishing. The support stand provides a support for a fishing pole (or, rod and reel) that is readily assembled and disassembled and which stores compactly when not in use. The stand height can be adapted for the environmental and surrounding conditions. The stand allows adjustment of line sensitivity, and may also increase the hook-up ratio due to the increased sensitivity.

In one particular aspect, the present invention is directed to a support stand having a tubular, elongated body having a first end and a second end, with a support structure removably connected to the first end of the body and a pole retaining mechanism at the second end of the body. The pole retaining mechanism has at least one concave region, preferably two concave regions, defined by the second end of the body and a pivot axis orthogonal to the concave region(s). The support structure can have three legs, or more, which are movable from a first location on the body to a second location on the body. The legs can fit inside the tubular body for compact storage.

In another particular aspect, the invention is directed to a fishing pole support stand that has a tubular, elongated body having a first end and a second end, a support structure removably connected to the first end of the body, and a pole retaining mechanism at the second end of the body. This pole retaining mechanism is configured for pivotal movement of a fishing pole retained therein. The stand itself is moveable between at least three configurations: a storage configuration with at least a portion of the support structure within the body; a first use-position having the pole retaining mechanism at a first height; and a second use-position having the pole retaining mechanism at a second height. The stand can be moved from the first use-position to the second use-position by modifying the configuration of the support structure, which could be three or more legs.

In yet another particular aspect, the invention is to a fishing pole support stand where the legs are movable from a first position, which places the pole retaining mechanism at a first height, to a second position, which places the pole retaining mechanism at a second height different than the first height. In particular, such a stand includes a tubular, elongated body having a first end and a second end, a pole retaining mechanism at the first end of the body, and at least three legs connected to the body at the second end.

Methods for making the stand and also for using the support stand are also described.

These and various other features that characterize the fishing pole stand of this disclosure are pointed out with particularity in the attached claims. For a better understanding of the fishing pole stand of the disclosure, its advantages, its use and objectives obtained by its use, reference should be made to the drawings and to the accompanying description, in which there is illustrated and described a preferred embodiment of the invention of this disclosure.

DETAILED DESCRIPTION

The present invention is directed to a support stand and holder for a fishing pole, and is particularly adapted for ice fishing or other fishing activity where the pole can be placed and does not need continuous holding by the angler. In use, when waiting for a fish to strike the line, the stand holds the fishing pole in a generally upward angled position, with the tip of the pole higher than the reel. The fishing pole is held in a pivotal manner, so that upon sensing a hit on the attached line, the fishing pole tips downward, dropping the pole tip and indicating a strike.

Figure 1:
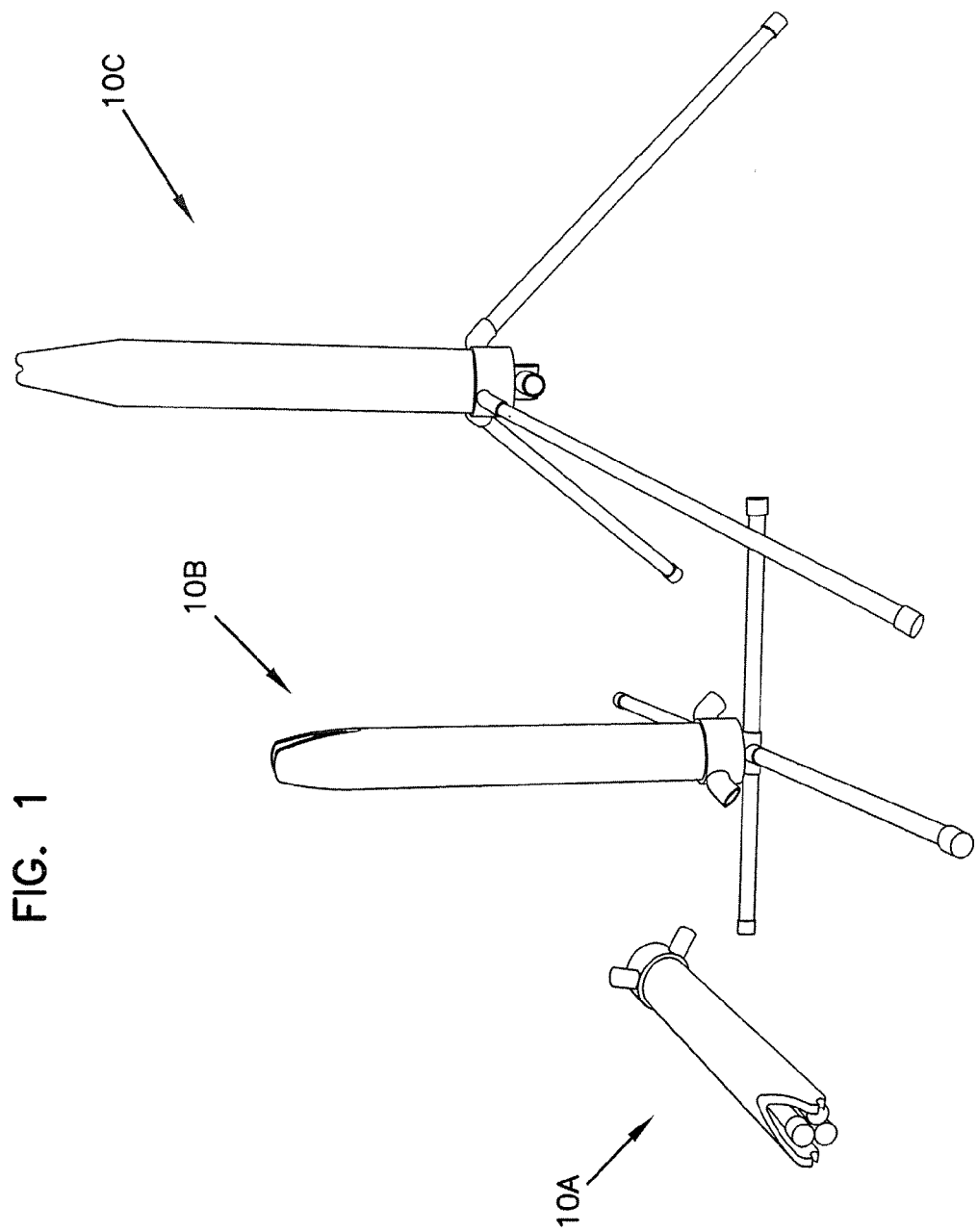
FIG. 1 is a perspective view of three fishing pole support stands according to the invention, each of the three support stands illustrated in a different configuration or position.
Figure 2:
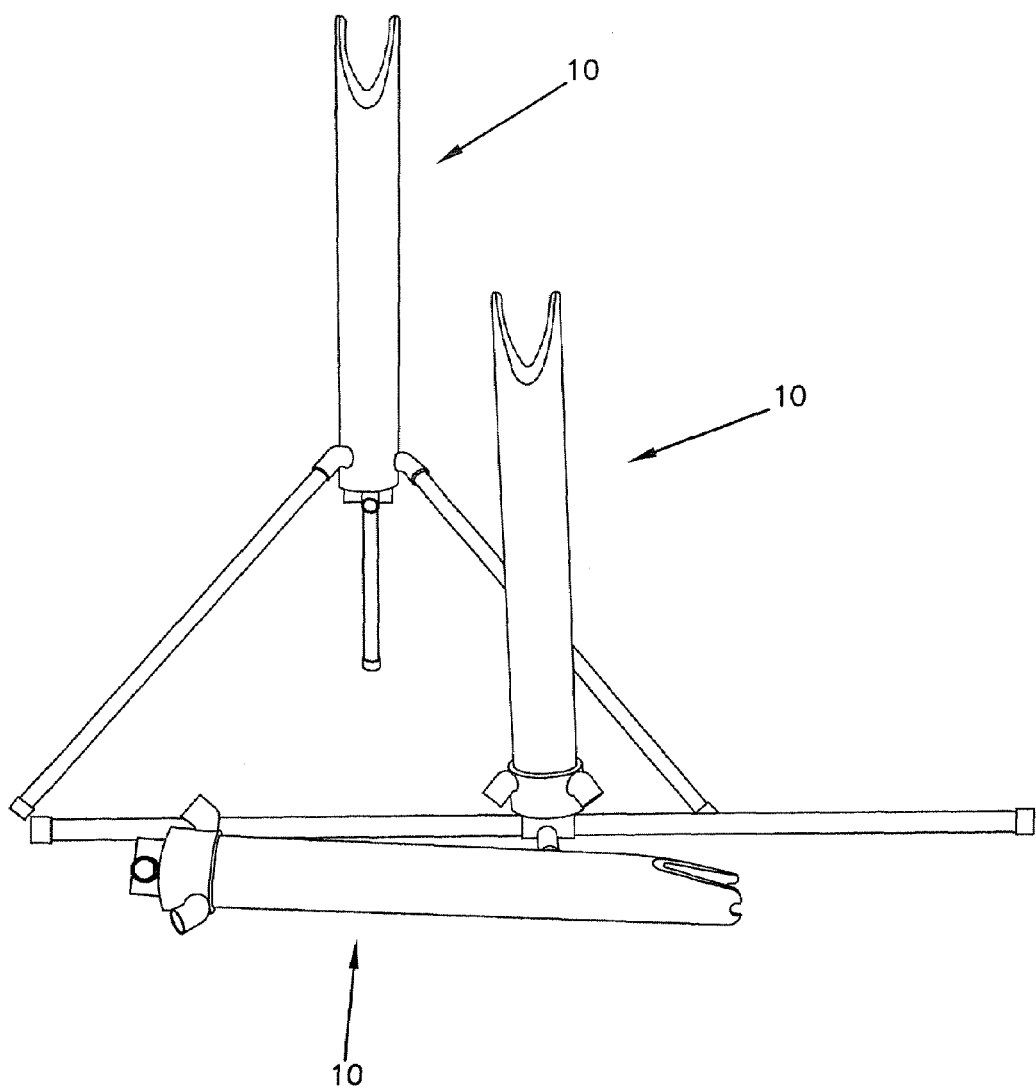
FIG. 2 is a perspective view of the three fishing pole support stands of FIG. 1, the point-of-view being generally orthogonal to that of FIG. 1.

Referring to the figures, specifically to FIGS. 1 and 2, a fishing pole stand 10 according to the present invention generally has a tubular (e.g., cylindrical) body and a support structure, such as legs. In FIGS. 1 and 2, three fishing pole stands 10 according to the invention are shown: the first stand 10a is assembled for storage and lying on its side on the ground, the second stand 10b is positioned in a first use-position, and the third stand 10c is positioned in a second use-position. In the first use-position, stand 10b sits lower than when in the second use-position, stand 10c. The lower position may be desired for occasions when environmental conditions (e.g., wind) or surrounding structures (e.g., fish house or bushes) warrant a lower stand.

Figure 3:
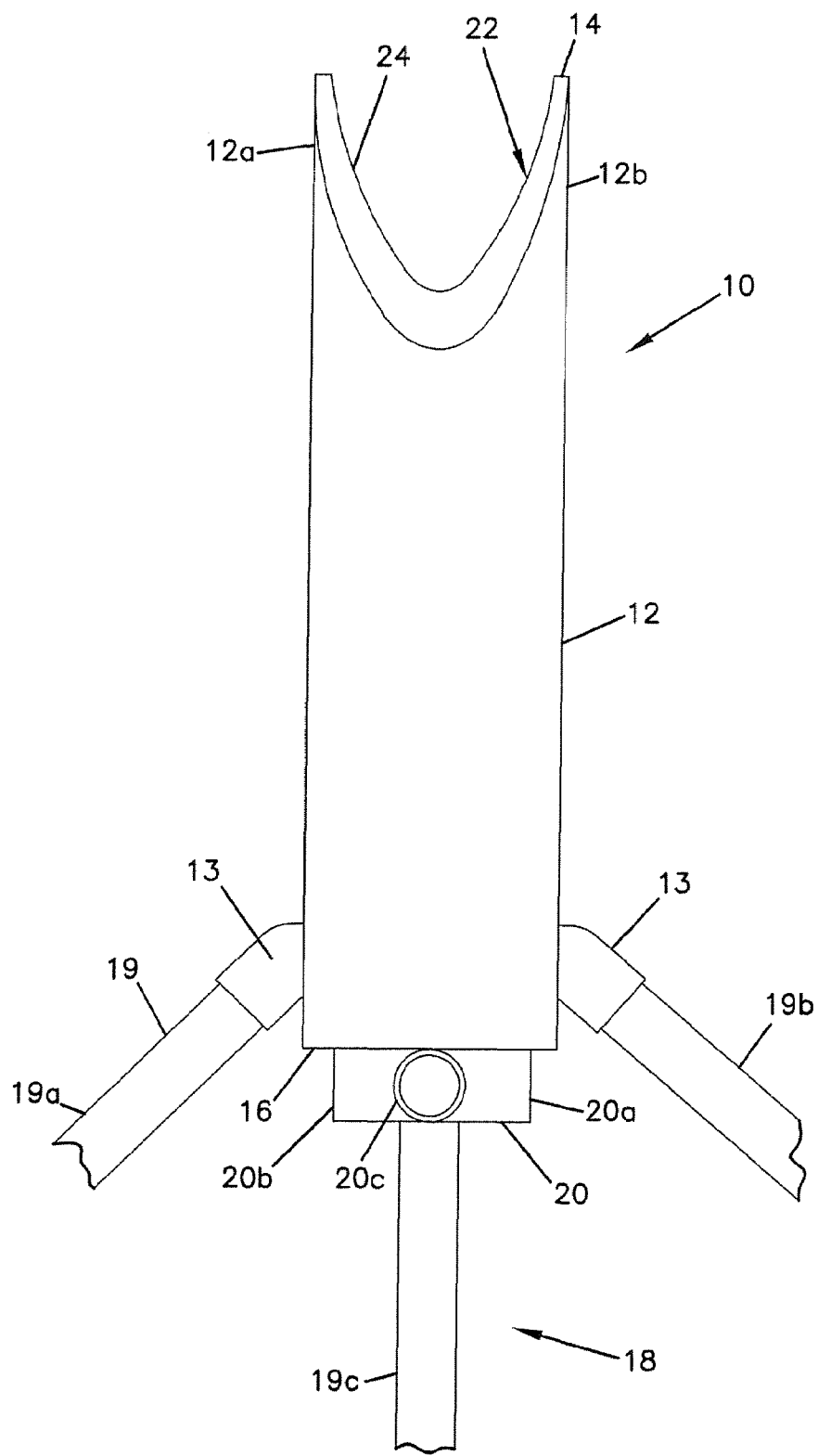
FIG. 3 is a schematic diagram of a portion of a fishing pole support stand, shown in an orientation similar to the orientation of FIG. 2
Figure 4:
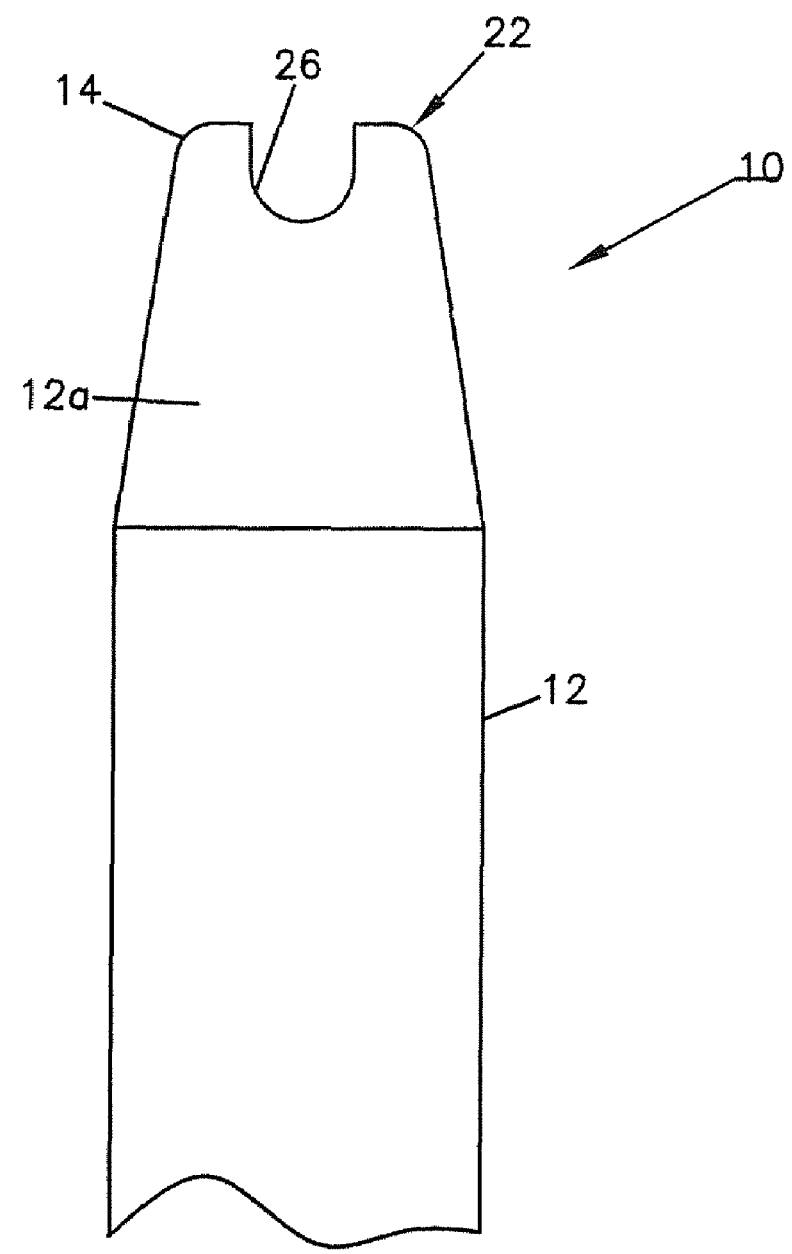
FIG. 4 is a schematic diagram of the fishing pole support stand of FIG. 3, the point-of-view being generally orthogonal to that of FIG. 3.

Referring to FIGS. 3 and 4, specific details of support stand 10 are discussed. FIG. 3 schematically illustrates support stand 10 and FIG. 4 schematically illustrates one end of support stand 10. Stand 10 includes an elongate body 12, which, in preferred embodiments, is hollow. Advantages of having a hollow body 12 will be discussed below. Body 12 includes a first end 14 and an opposite second end 16. First end 14 is configured to hold a fishing pole, as will be described below. If hollow, body 12 includes an interior volume (not seen). Body 12 can be any suitable shape, however, a cylindrical body is preferred. Body 12 can additionally be any suitable size, diameter and/or length, depending on the desired size of the support stand. Body 12 is usually 6 to 24 inches long, and in most designs, is about 18 to 20 inches long, and is usually 1 to 4 inches wide. A monolithic body 12 is preferred, due to its simplicity.

Removably connected to second end 16 of body 12 is a support structure 18, which, in this embodiment, includes three removable legs 19, specifically legs 19a, 19b, 19c, evenly spaced around body 12. Legs 19 are removably connected to body 12, such as by fixtures or apertures 13 on body 12 which receive a portion of legs 19 and retain legs 19 to body 12. The configuration of FIG. 3 has stand 10 with legs 19 in the second use-position, which is also illustrated in FIGS. 1 and 2. In the second use-position, stand 10 is supported by legs 19 in an angled, yet generally upright, position. Legs 19 contact the ground at their ends, which support the weight of stand 10. Legs 19 are removable from body 12 and can alternately or additionally be positioned at second end 16 in the first use-position, as shown in FIGS. 1 and 2. In the first use-position, legs 19 are generally horizontal, and contact the ground along the length of legs 19.

Support structure 18 includes manifold 20, for retaining legs 19 in a generally horizontal position, for the first use-position. Manifold 20 includes three apertures 20a, 20b, 20c. These apertures 20a, 20b, 20c are configured to receive legs 19a, 19b, 19c, respectively. Aperture 20a is configured to receive leg 19a to a depth of, for example about ⅝ inch, aperture 20b is configured to receive leg 19b to a depth of, for example about ⅝ inch, and aperture 20c is configured to have leg 19c pass through manifold 20 to the other side. See FIGS. 1 and 2 where stand 10 is in the first use-position.

By providing stand 10 with two positions for legs 19, which provide two different heights, telescoping legs can be avoided, as can foldable legs. Additionally or alternatively, by providing stand 10 with two positions for legs 19, a telescoping body can be avoided.

Figure 5:
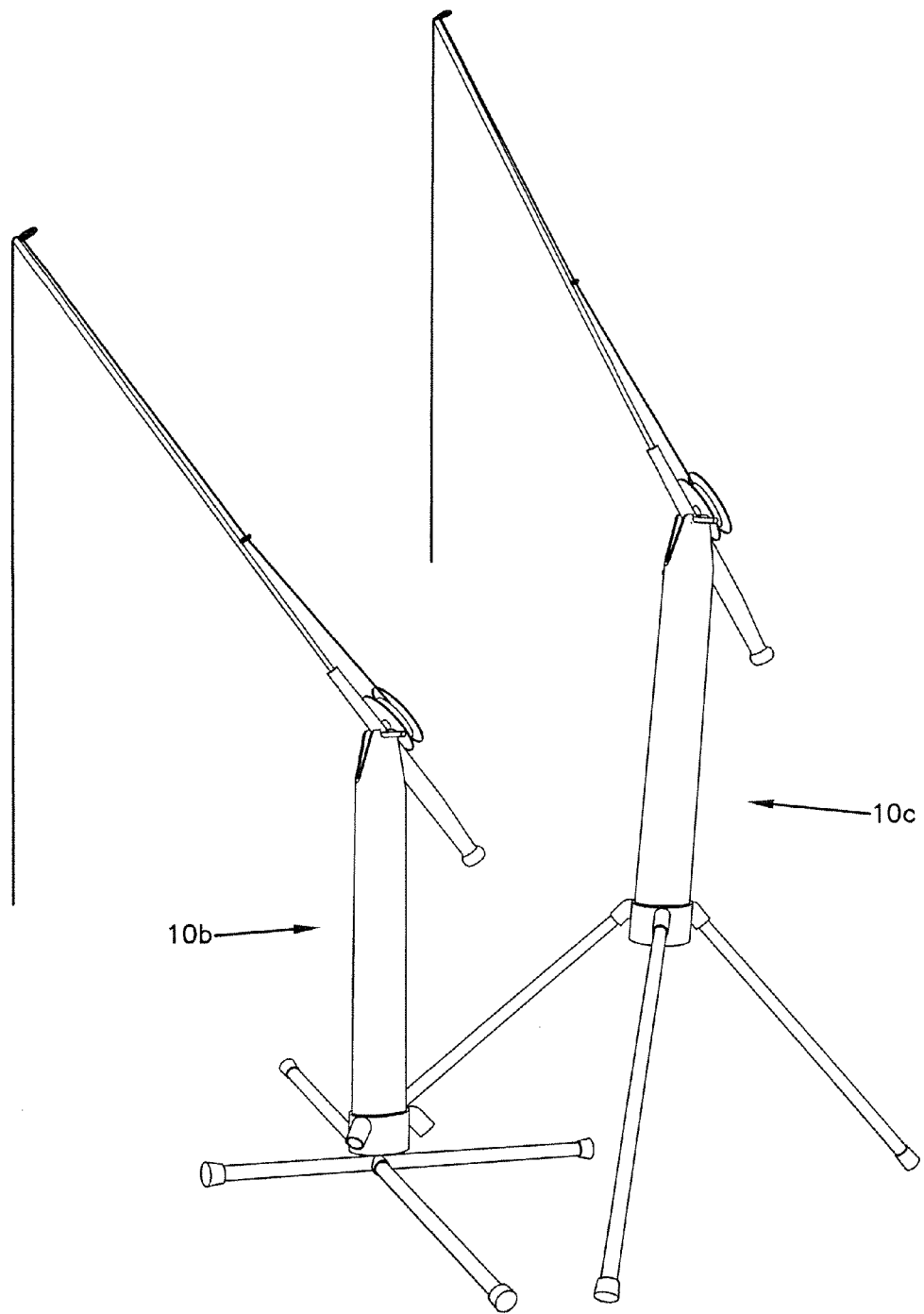
FIG. 5 is a perspective view of two fishing pole support stands according to the present invention, each illustrated holding a fishing pole in an upright position.
Figure 6:
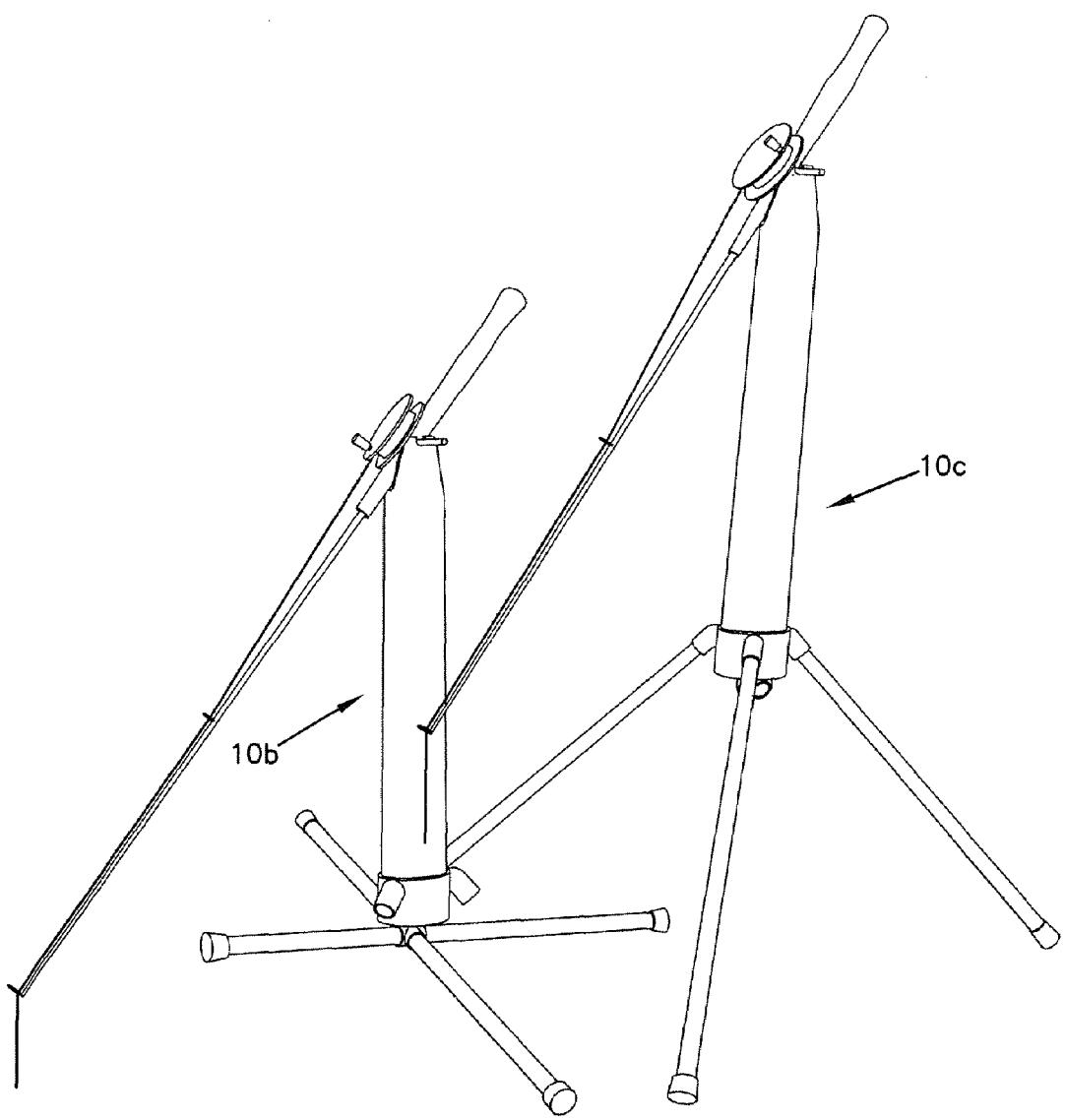
FIG. 6 is a perspective view of the two fishing pole support stands and fishing poles of FIG. 5, with the fishing poles in a tipped-down position.

Returning to the figures, at first end 14, stand 10 includes a pole retaining mechanism 22. FIGS. 5 and 6 show a fishing pole held within the pole retaining mechanism. In FIG. 5, the pole is in a "tip up" position (with the tip of the pole being higher than the reel and handle of the pole), whereas in FIG. 6, the pole is in a "tip down" or "tipped" position (with the tip of the pole being lower than the reel and handle of the pole). The pole pivots in the pole retaining mechanism 22 to allow the change in position. Additionally, the pole is easily placed into and removed from the pole retaining mechanism 22, and pivots readily.

Returning to FIG. 3 and to FIG. 4, pole retaining mechanism 22 includes two concave regions 24 in body 12 separated by body sidewalls 12a and 12b. See also FIG. 7 where the two concave regions can be seen. Concave regions 24 are preferably sized to receive the fishing pole therein, and allow easy movement of the pole. That is, the pole should not bind or get caught on the edges of concave regions 24. Preferably, the edge of each concave region 24 is beveled outward; this facilitates support of the pole by retaining mechanism 22. A bevel of 45 degrees should hold the pole at 45 degrees to the surface on which stand 10 is set. Other degrees of bevel are, of course, suitable.

Present in each of sidewalls 12a, 12b is an indent 26, configured to receive a portion of the pole or reel therein. Alternately, indent 26 can be configured to receive a pin or other feature present on the pole and/or reel. In use, the pole directly or indirectly rests in indents 26 sufficiently loose to allow the pole to pivot about indents 26. Indents 26 provide an axis for pivoting the pole from the tip-up position to the tip-down position. The shape and size of indents 26 can be configured for a specific pole and/or reel, and to adjust the sensitivity of the pivot.

Preferably, retaining mechanism 22, in particular concave region 24 and indent 26, are shaped and sized to pivotally hold the pole without the use of strings, wires, clips, or other such retaining mechanisms.

If body 12 is hollow, as is preferred, legs 19 can be stored within body 12, providing a compact stand 10 when not in use. In a preferred embodiment, access is gained to interior 50 of body 12 at first end 14. At second end 16, body 12 is preferably sealed, for example, by manifold 20; that is, access cannot be gained to interior 50 via second end 16.

Figure 7:
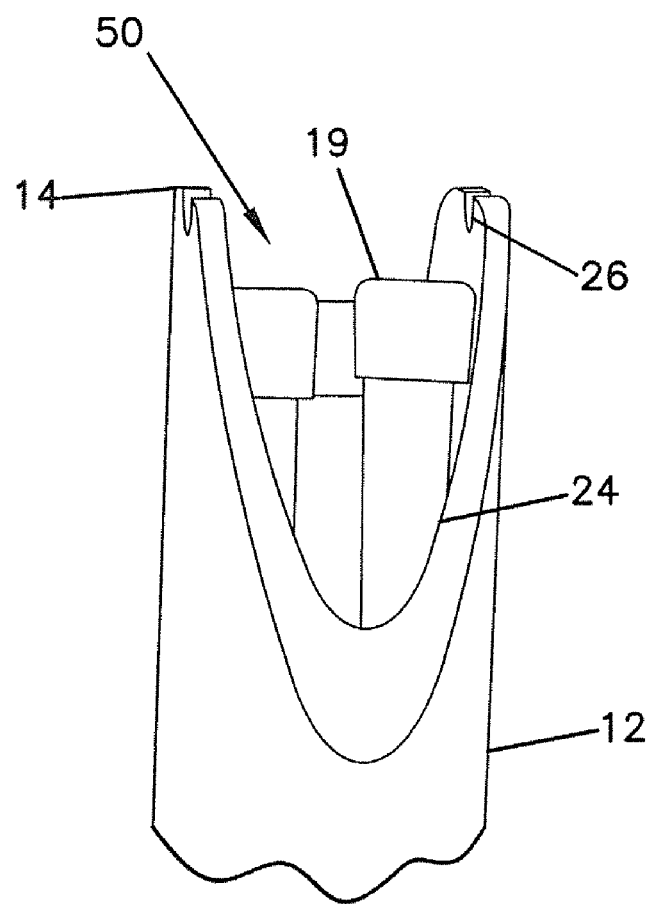
FIG. 7 is a close-up view of an end portion of a fishing pole support stand according to the invention.

FIG. 7 provides a close up view of the legs of the stand positioned within the body interior (i.e., legs 19 of stand 10 are positioned within interior 50). In this storage position, the entire length of legs 19 fits within interior 50 of body 12, or only a portion of legs 19 fits within interior 50, depending on the length of legs 19 and of body 12. Also, preferably all of legs 19 fit within interior 50.

A preferred embodiment of support stand 10 is made from the following materials using the following steps.

A preferred material for body 12 is a 2½ inch diameter pipe, such as PVC pipe. A preferred length is about 18–20 inches, but can definitely be longer or shorter. Legs 19 are also preferably plastic, such as PVC, and are generally similar in length to body 12. A preferred diameter for legs 19 is ⅝ inch. If used, a hollow leg is preferably capped on one end, to inhibit snow and ice from collecting in the leg. Plastic is a preferred material for the parts of stand 10, due to it not conducting cold, and also because it is readily paintable.

To provide features to mount legs 19 to body 12, three equally spaced holes are drilled into body 12 at an angle close to about 45 degrees about ¾ to 1 inch from the end; these holes will hold legs 19 for the second use-position. Closer to the end of body 12, four equally spaced holes are drilled into body 12 at zero angle; these holes will hold legs 19 for the first use-position. Alternately, a retaining member or piece could be present at second end 16 of body 12 to receive legs 19; see FIGS. 1 and 2 in which a collar for receiving legs 19 is seen.

At first end 14, body 12 is cut to form concave regions 24. The remaining sidewalls 12a, 12b can be cut or drilled to form indents 26.

In an alternate embodiment, manifold 20, having holes to receive legs 19, is an element separate from, which is then attached to, body 12.

To use stand 10, the following general method is used.

Prior to use, stand 10 typically has legs 19 stored within hollow interior 50 of body 12, as illustrated in FIG. 7 and in the storage position of FIGS. 1 and 2. To set up stand 10, legs 19 are removed from body 12 and, depending on the desired height of stand 10, inserted either into apertures 20a, 20b, 20c to have stand 10 in the first use-position, or into body 12 to have stand in the second use-position. Stand 10 is placed on a surface, such as ice. A fishing pole is placed across end 14 so that the pole rests in concave regions 24 (as in FIG. 5). The pole is positioned so that either the reel or another portion of the pole rests in indents 26. The pole is balanced so that the tip of the pole is up, higher than the reel.

The fishing line from the pole is dropped into the water and the wait begins. Upon movement or disturbance of the line, such as by a fish striking the lure or bait, the pole pivots in indents 26, thus tipping the pole tip downward (as in FIG. 6).

To pack stand 10 after use, legs 19 are removed from second end 16 and returned to interior 50 of body 12. The collapsed stand 10 can be readily carried and stored until used again.

It should be understood that the pack of the present invention could be modified and remain within the scope of the invention. For example, other materials could be used for the body and/or the legs, and other shapes and sizes could be used. Four or more legs could be used rather than only three. The above specification and examples are believed to provide a complete description of the manufacture and use of particular embodiments of the invention. Because many embodiments of the invention can be made without departing from the spirit and scope of the invention, the true scope and spirit of the invention reside in the broad meaning of the claims hereinafter.

What is claimed is:

1. A fishing pole support stand comprising:
a tubular, elongated rigid body having a first end and a second end;
a support structure comprising three legs configured to be removably connected to the first end of the body in a first position and a second position, the three legs each have an end and a middle, the support structure further comprising:
a first set of apertures on the first end of the body for receiving the ends of the legs;
a manifold on the first end of the body spaced below the first set of apertures, the manifold including three apertures which all extend in a single plane transverse to a longitudinal axis of the body, two of the three apertures receiving only the ends of the legs to a depth within the two apertures, and the third of the three apertures extending completely through the manifold and which allows one of the legs to pass through the manifold from one side to the other side of the manifold;
wherein in the first position, the three legs are connected to the body by having their ends received in respective apertures of the first set of apertures, and
wherein in the second position, two of the three legs are connected to the body by having only the ends of the two legs received to the depth within the two of the three apertures of the manifold, and the third lea of the three legs is received in the third of the three apertures so that the third leg extends completely therethrough with the middle of the third lea being located in the third aperture and with opposing portions of the third leg extending on either side of the manifold, and wherein the three legs all extend in a single horizontal plane in the second position; and
a pole retaining mechanism at the second end of the body, the pole retaining mechanism comprising two opposite concave regions defined by the second end of the body forming a taper at the second end and a pivot axis defined by the second end of the body orthogonal to the concave regions.

2. The fishing pole stand according to claim 1 wherein the three legs fit inside the tubular body.

3. The fishing pole stand according to claim 1 wherein the body and the legs are plastic.

4. A fishing pole support stand comprising:
a tubular, elongated rigid body having a first end and a second end;
a support structure comprising three legs removably connectable to the first end of the body, the three legs each have an end and a middle, the support structure further comprising:
a first set of apertures on the first end of the body for receiving the ends of the legs;
a manifold on the first end of the body spaced below the first set of apertures, the manifold including three apertures which all extend in a single plane transverse to a longitudinal axis of the body, two of the three apertures receiving only the ends of the legs to a depth within the two apertures, and the third of the three apertures extending completely through the manifold and which allows one of the legs to pass through the manifold from one side to the other side of the manifold;
wherein in a first use-position, the three legs are connected to the body by having their ends received in respective apertures of the first set of apertures, and
wherein in a second use-position, two of the three legs are connected to the body by having only the ends of the two legs received to the depth within the two of the three apertures of the manifold, and the third leg of the three legs is received in the third of the three apertures so that the third leg extends completely therethrough with the middle of the third lea being located in the third aperture and with opposing portions of the third leg extending on either side of the manifold, and wherein the three legs all extend in a single horizontal plane in the second use-position;
a pole retaining mechanism comprising two opposite angled concave regions defined by the second end of the body configured for pivotal movement of a fishing pole retained therein, the stand further configured for:
a storage configuration with the three legs received within the body;
the first use-position having the pole retaining mechanism at a first height; and
the second use-position having the pole retaining mechanism at a second height.

5. A fishing pole support stand comprising:
a tubular, elongated rigid body having a first end and a second end;
a pole retaining mechanism at the first end of the body, the pole retaining mechanism comprising two opposite concave regions defined by the first end of the body, the concave regions having beveled edges, and a pivot axis defined by the first end of the body generally orthogonal to the concave regions;
a support structure comprising at least three legs connected to the body at the second end, the at least three legs each have an end and a middle, the support structure further comprising:
a first set of apertures on the first end of the body for receiving the ends of the legs;
a manifold on the first end of the body spaced below the first set of apertures, the manifold including three apertures which all extend in a single plane transverse to a longitudinal axis of the body, two of the three apertures receiving only the ends of the legs to a depth within the two apertures, and the third of the three apertures extending completely through the manifold and which allows one of the legs to pass through the manifold from one side to the other side of the manifold;

wherein the legs are movable from a first position, which places the pole retaining mechanism at a first height, to a second position, which places the pole retaining mechanism at a second height different than the first height;

wherein in the first position, the three legs are connected to the body by having their ends received in respective apertures of the first set of apertures; and wherein in the second position, two of the three legs are connected to the body by having only the ends of the two legs received to the depth within the two of the three apertures of the manifold, and the third leg of the three legs is received in the third of the three apertures so that the third leg extends completely therethrough with the middle of the third leg being located in the third aperture and with opposing portions of the third leg extending on either side of the manifold, and wherein the three legs all extend in a single horizontal plane in the second position.

6. The fishing pole support stand according to claim 5 wherein the three legs fit inside the tubular body.

7. The fishing pole support stand according to claim 5 wherein the body and the legs are plastic.

* * * * *